(12) United States Patent
Tait et al.

(10) Patent No.: US 8,122,610 B2
(45) Date of Patent: Feb. 28, 2012

(54) SYSTEMS AND METHODS FOR IMPROVED COORDINATION ACQUISITION MEMBER COMPRISING CALIBRATION INFORMATION

(75) Inventors: Hogar Tait, San Marcos, CA (US); Brian Frohlich, Poway, CA (US)

(73) Assignee: Hexagon Metrology, Inc., Norcross, GA (US)

(*) Notice: Subject to any disclaimer, the term of this patent is extended or adjusted under 35 U.S.C. 154(b) by 202 days.

(21) Appl. No.: 12/057,918

(22) Filed: Mar. 28, 2008

(65) Prior Publication Data
US 2009/0241360 A1 Oct. 1, 2009

(51) Int. Cl.
G01B 5/008 (2006.01)
(52) U.S. Cl. ............................................. 33/502; 33/503
(58) Field of Classification Search ............ 33/502–504, 33/549, 555, 556
See application file for complete search history.

(56) References Cited

U.S. PATENT DOCUMENTS

| | | | |
|---|---|---|---|
| 4,588,339 A | 5/1986 | Bilz | |
| 4,972,090 A | 11/1990 | Eaton | |
| 5,084,981 A | 2/1992 | McMurtry et al. | |
| 5,088,337 A | 2/1992 | Bennet | |
| 5,148,377 A | 9/1992 | McDonald | |
| 5,187,874 A | 2/1993 | Takahashi et al. | |
| 5,189,797 A | 3/1993 | Granger | |
| 5,396,712 A | 3/1995 | Herzong | |
| 5,408,754 A | 4/1995 | Raab | |
| 5,412,880 A | 5/1995 | Raab | |
| 5,505,003 A | 4/1996 | Evans et al. | |
| 5,510,977 A | 4/1996 | Raab | |
| 5,521,847 A | 5/1996 | Ostrowski et al. | |
| 5,526,576 A | 6/1996 | Fuchs et al. | |
| 5,528,505 A | 6/1996 | Granger et al. | |
| 5,611,147 A | 3/1997 | Raab | |
| 5,615,489 A | 4/1997 | Breyer et al. | |
| 5,757,499 A | 5/1998 | Eaton | |
| 5,768,792 A | 6/1998 | Raab | |
| 5,794,356 A | 8/1998 | Raab | |
| 5,822,450 A | 10/1998 | Arakawa et al. | |
| 5,829,148 A | 11/1998 | Eaton | |
| 5,978,748 A | 11/1999 | Raab | |
| 5,991,704 A | 11/1999 | Rekar et al. | |
| 6,044,569 A * | 4/2000 | Ogihara et al. | 33/503 |
| 6,134,506 A | 10/2000 | Rosenberg et al. | |
| 6,161,079 A | 12/2000 | Zink et al. | |
| 6,166,811 A | 12/2000 | Long et al. | |
| 6,219,928 B1 | 4/2001 | Raab et al. | |
| 6,301,796 B1 * | 10/2001 | Cresson | 33/556 |
| 6,366,831 B1 | 4/2002 | Raab | |
| 6,487,896 B1 | 12/2002 | Dall'Aglio | |

(Continued)

FOREIGN PATENT DOCUMENTS

DE 4345091 A1 7/1995
(Continued)

*Primary Examiner* — Yaritza Guadalupe-McCall
(74) *Attorney, Agent, or Firm* — Knobbe, Martens, Olson & Bear, LLP

(57) ABSTRACT

Apparatus, systems and methods for an improved probe for a coordinate measurement machine (PCMM) is disclosed herein. The probe comprises a machine readable unique serial number, which the PCMM can read from the probe to identify the probe and obtain information relating to calibration of the probe by matching the unique serial number with unique serial number stored with the information relating calibration. The coordinate information device further comprises modules configured to store and provide the machine readable unique serial number, and also information relating to calibrating the probe.

41 Claims, 7 Drawing Sheets

U.S. PATENT DOCUMENTS

| | | |
|---|---|---|
| 6,526,670 B1 | 3/2003 | Carli |
| 6,535,794 B1 * | 3/2003 | Raab .................... 700/262 |
| 6,598,306 B2 | 7/2003 | Eaton |
| 6,611,346 B2 | 8/2003 | Granger |
| 6,611,617 B1 | 8/2003 | Crampton |
| 6,612,044 B2 * | 9/2003 | Raab et al. ................ 33/503 |
| 6,618,496 B1 | 9/2003 | Tassakos et al. |
| 6,668,466 B1 | 12/2003 | Bieg |
| 6,759,648 B2 | 7/2004 | Baxter et al. |
| 6,817,108 B2 | 11/2004 | Eaton |
| 6,820,346 B2 * | 11/2004 | Raab et al. ................ 33/503 |
| 6,892,465 B2 | 5/2005 | Raab et al. |
| 6,904,691 B2 | 6/2005 | Raab et al. |
| 6,925,722 B2 | 8/2005 | Raab et al. |
| 6,931,745 B2 | 8/2005 | Granger |
| 6,952,882 B2 | 10/2005 | Raab et al. |
| 6,984,236 B2 | 1/2006 | Raab |
| 6,988,322 B2 | 1/2006 | Raab et al. |
| 7,003,892 B2 | 2/2006 | Eaton et al. |
| 7,017,275 B2 | 3/2006 | Raab et al. |
| 7,043,847 B2 | 5/2006 | Raab et al. |
| 7,051,450 B2 | 5/2006 | Raab et al. |
| 7,073,271 B2 | 7/2006 | Raab et al. |
| 7,152,456 B2 | 12/2006 | Eaton |
| 7,174,651 B2 | 2/2007 | Raab et al. |
| 7,246,030 B2 | 7/2007 | Raab et al. |
| 7,269,910 B2 | 9/2007 | Raab et al. |
| 7,296,364 B2 | 11/2007 | Seitz et al. |
| 7,296,979 B2 | 11/2007 | Raab et al. |
| 7,372,581 B2 | 5/2008 | Raab et al. |
| 7,395,606 B2 | 7/2008 | Crampton |
| 7,441,341 B2 | 10/2008 | Eaton |
| 7,546,689 B2 | 6/2009 | Ferrari et al. |
| 7,568,293 B2 | 8/2009 | Ferrari |
| 7,578,069 B2 | 8/2009 | Eaton |
| D599,226 S | 9/2009 | Gerent et al. |
| 7,624,510 B2 | 12/2009 | Ferrari |
| 7,640,674 B2 | 1/2010 | Ferrari et al. |
| 7,693,325 B2 | 4/2010 | Pulla et al. |
| 7,743,524 B2 | 6/2010 | Eaton et al. |
| 7,774,949 B2 | 8/2010 | Ferrari |
| 7,779,548 B2 | 8/2010 | Ferrari |
| 7,784,194 B2 | 8/2010 | Raab et al. |
| 7,805,854 B2 | 10/2010 | Eaton |
| 2004/0035014 A1 * | 2/2004 | Raab et al. ................ 33/503 |
| 2004/0185706 A1 | 9/2004 | Price et al. |
| 2007/0063500 A1 | 3/2007 | Eaton |
| 2008/0016711 A1 | 1/2008 | Baebler |
| 2008/0052936 A1 * | 3/2008 | Briggs et al. ................ 33/502 |
| 2008/0289204 A1 | 11/2008 | Crampton |
| 2009/0025243 A1 | 1/2009 | Prestidge et al. |
| 2010/0095542 A1 | 4/2010 | Ferrari |
| 2010/0325907 A1 | 12/2010 | Tait |
| 2011/0119026 A1 | 5/2011 | Atwell et al. |

FOREIGN PATENT DOCUMENTS

| | | |
|---|---|---|
| DE | 101 12 977 | 11/2002 |
| EP | 0522610 A1 | 6/1992 |
| FR | 2740546 | 1/1998 |
| GB | 2274526 A | 7/1994 |
| JP | 404057690 | 2/1992 |
| JP | 04-032393 | 5/1992 |
| JP | 05-031685 | 2/1993 |
| JP | 2003-021133 | 1/2003 |
| JP | 2003025176 | 1/2003 |
| JP | 2003/175484 | 9/2003 |
| JP | 2003275484 | 9/2003 |
| JP | 2006-214559 | 8/2006 |
| WO | WO 98/08050 | 2/1998 |

\* cited by examiner

SYSTEMS AND METHODS FOR IMPROVED COORDINATION ACQUISITION MEMBER COMPRISING CALIBRATION INFORMATION

BACKGROUND OF THE INVENTION

1. Field of the Invention

This application relates to measuring devices, and more particularly to articulated spatial coordinate measuring machines.

2. Description of the Related Art

Portable coordinate measurement machines (PCMMs) such as articulated arm PCMMs can be used to perform a variety of measurement and coordinate acquisition tasks. In one common commercially-available PCMM, an articulated arm having three transfer members connected by articulating joints allows easy movement of a probe about seven axes to take various measurements.

For optimal precision and accuracy of the measurements generated by a PCMM, it must initially be calibrated to account for any manufacturing variations in the components of the PCMM itself. In one method, a portable coordinate measurement machine would be calibrated by using the PCMM to measure one or more length artifacts such as bars of precisely known dimensions. By using a PCMM to measure lengths of a length artifact having precisely known dimensions, position data obtained by the PCMM could be analyzed, to calibrate for errors in the PCMM.

In addition to the PCMM itself, when a probe is first connected to a PCMM, the probe itself must be calibrated for the specific PCMM. Each type of probe has nominal data that describe parameters of the probe, such as, for example, length, offset, category, type, capacity, features, etc. The nominal data for the probe is typically provided on a separate storage media such as a disk, memory key, hard disk on a computer, etc. The nominal data is often shipped along with the probe. When the probe is calibrated to the PCMM, the nominal data is used as a starting point for calibration. Therefore, matching the probe with the corresponding nominal data is essential for accurate calibration. Because nominal data is often contained in a separate media, associating the probe with the appropriate nominal data during the calibration process can prove to be difficult, particularly when probes are used with multiple PCMMs.

Further, each probe is typically calibrated once for each different PCMM that it is used on. That is, the probe's calibration data is unique to the particular probe and the PCMM. As with nominal data, the probe's calibration data is also typically stored in media different from the probe, such as, for example, a memory key, hard disk on a computer, storage area located on the PCMM, etc. When a particular probe that is already calibrated to the PCMM, for example, is reattached to the PCMM, the PCMM has to obtain the corresponding calibration data to accurately use the probe. Therefore, it is important that the calibration data that is generated for a probe is matched to that particular probe. Current PCMMs use identification resistors located on the probes to identify the probes such that the PCMM can obtain the corresponding calibration data from the different storage media. However, identification resistors typically contain enough information to only identify probes by type or category. As such, using the probe identification resistors to match the calibration data with the corresponding probe has shortcomings. For example, associating a particular probe with calibration data becomes extremely difficult in settings where multiple probes of the same type and/or category are used because identification resistors do not distinguish between different probes of the same type and/or category. Therefore, solutions that address these and other deficiencies are desired.

SUMMARY OF THE INVENTION

In one embodiment, a probe for a coordinate measurement machine is disclosed, wherein the probe comprises a probe tip, a probe mount, and a probe carriage, wherein the probe carriage comprises at least one device configured to provide information relating to calibrating the probe with a coordinate measurement machine. In some embodiments, the probe carriage comprises a solid-state memory device configured to store data. In other embodiments, the solid-state memory device comprises a non-volatile electrically erasable programmable read-only memory (EEPROM) device. In another embodiment, the solid-state memory device comprises a machine readable serial number configured to uniquely identify the probe. In still another embodiment, the solid-state memory device is further configured to store nominal data relating to the physical parameters of the probe.

Further, the probe carriage of the probe comprises a temperature sensor configured to provide the temperature of the probe. In one embodiment, the probe carriage comprises a presence detection sensor configured to indicate that the probe is mounted onto a coordinate measurement machine. In another embodiment, the probe carriage of the probe further comprises a processor configured to control the operations of the solid-state memory device, the temperature sensor, or the presence detection sensor. In yet another embodiment, the probe neck comprises at least one device configured to provide information relating to calibrating the probe with the coordinate measurement machine.

In some embodiments, a spatial coordinate measurement system comprises a coordinate measurement machine comprising an articulated arm, a probe that is removably attached to the articulated arm, wherein the probe comprises at least one device configured to provide information relating to calibrating the probe with the coordinate measurement machine. In one embodiment, the coordinate measurement machine calibrates the probe based at least in part on the information provided by at least one device configured to provide information relating to calibrating the probe with the coordinate measurement machine.

In another embodiment, a method of calibrating a probe comprises attaching the probe to the coordinate measurement machine, detecting the probe, acquiring calibration information related to the probe, and calibrating the probe to the coordinate measurement machine using at least part of the acquired calibration information. In some embodiments, the method can include storing the calibration information in the probe, arm, or processor.

In some embodiments, a coordinate measurement system is provided. The coordinate measurement system comprises a processor, a first transfer member, a second transfer member, and a probe. The second transfer member is movably coupled to the first transfer member. The probe movably coupled to the second transfer member. The probe is electrically coupled to the processor with a wire bundle consisting essentially of a power wire and a ground wire.

BRIEF DESCRIPTION OF THE DRAWINGS

Further objects, features and advantages of the invention will become apparent from the following detailed description taken in conjunction with the accompanying figures showing illustrative embodiments of the invention, in which.

DETAILED DESCRIPTION OF THE PREFERRED EMBODIMENT

Figure 1:
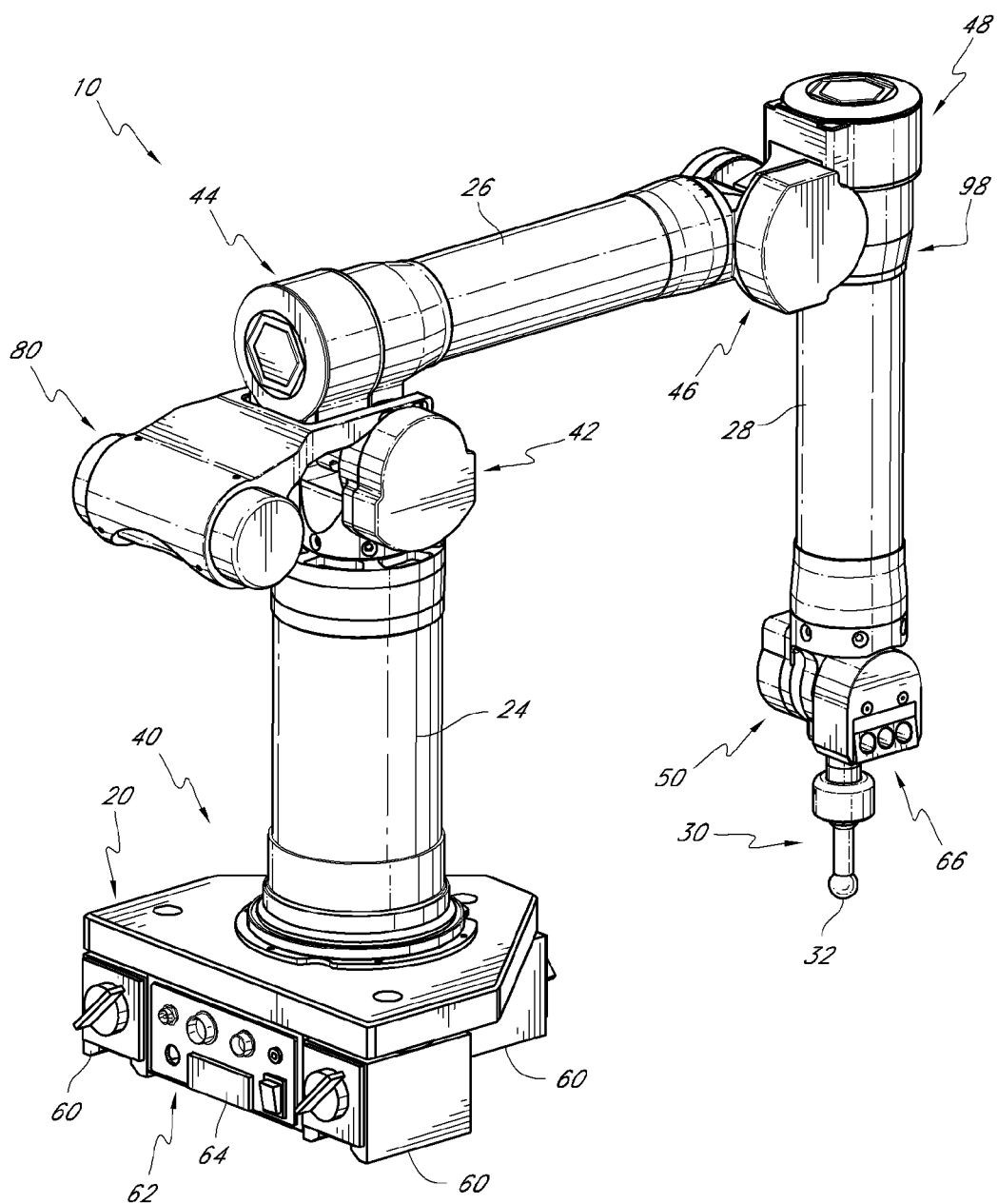
FIG. 1 is a perspective view of one embodiment of coordinate measuring machine containing an articulated arm and a probe.

FIG. 1 illustrates one embodiment of a coordinate measuring machine (PCMM) 10. In the illustrated embodiment, the PCMM 10 comprises a base 20, a plurality of substantially rigid, transfer members 24, 26, and 28, a probe 30, and a plurality of articulation members 40, 42, 44, 46, 48, 50 connecting the rigid transfer members 24, 26, 28 to one another. Each of articulation members 40, 42, 44, 46, 48, 50 is configured to impart one or more rotational and/or angular degrees of freedom. The articulation members 40, 42, 44, 46, 48, 50 enable the transfer members 24, 26, 28 of the PCMM 10 to be aligned in various spatial orientations thereby allowing fine positioning of the probe 30 in three-dimensional space.

The position of the rigid transfer members 24, 26, 28 and the probe 30 may be adjusted manually, or using robotic, semi-robotic, and/or any other adjustment method. In one embodiment, the PCMM 10, through the various articulation members 40, 42, 44, 46, 48, 50, is provided with six rotary axes of movement. In other embodiments, the PCMM 10 can be configured to have more or fewer axes of movement.

The probe 30 can comprise a contact sensitive member 32 configured to engage surfaces of a selected object and/or generate coordinate data on the basis of probe contact as is known in the art. Alternatively, the probe 30 can comprise a remote scanning and detection component that does not necessarily require direct contact with the selected object to acquire geometry data. In one embodiment, a laser coordinate detection device (e.g., laser probe) can be used to obtain geometry data without direct object contact. It will be appreciated that in various embodiments of the PCMM 10, various probe 30 configurations can be used including without limitation: a contact-sensitive probe, a hard probe, a remote-scanning probe, a laser-scanning probe, a probe that uses a strain gauge for contact detection, a probe that uses a pressure sensor for contact detection, a probe that used an infrared beam for positioning, and a probe configured to be electro-statically-responsive can be used for the purposes of coordinate acquisition.

With continued reference to FIG. 1, in various embodiments of the PCMM 10, the various devices which may be used for coordinate acquisition, such as the probe 30, may be configured to be manually disconnected and reconnected from the PCMM 10 such that a user can change probes without specialized tools. Thus, a user can quickly and easily remove one probe and replace it with another probe. Such a connection may comprise any quick disconnect or manual disconnect device. This rapid connection capability of a probe can be particularly advantageous in a PCMM that can be used for a wide variety of measuring techniques (e.g. measurements requiring physical contact of the probe with a surface followed by measurements requiring only optical contact of the probe) in a relatively short period of time.

In the embodiment of FIG. 1, the probe 30 also comprises buttons 66, which are configured to be accessible by a user. By pressing one or more of the buttons 66 singly, multiply, or in a preset sequence, the user can input various commands to the PCMM 10. In some embodiments, the buttons 66 can be used to indicate that a coordinate reading is ready to be recorded. In other embodiments, the buttons 66 can be used to indicate that the location being measured is a home position and that other positions should be measured relative to the home position. In still other embodiments, the buttons may be used to turn on or off the PCMM 10. In other embodiments, the buttons 66 can be programmable to meet a user's specific needs. The location of the buttons 66 on the probe 30 can be advantageous in that a user need not access the base 20 or a computer in order to activate various functions of the PCMM 10 while using the probe 30. This positioning may be particularly advantageous in embodiments of PCMM having transfer members 24, 26, or 28 that are particularly long, thus placing the base 20 out of reach for a user of the probe 30. In some embodiments of the PCMM 10, any number of user input buttons (for example having more or fewer than the three illustrated in FIG. 1), can be provided, which may be placed in various other positions on the probe 30 or anywhere on the PCMM 10. Other embodiments of PCMM can include other user input devices positioned on the PCMM 10 or the probe 30, such as switches, rotary dials, or touch pads in place of, or in addition to user input buttons.

With continued reference to FIG. 1, in some embodiments, the base 20 further comprises magnetic attachment mounts 60 that can attach the base 20 to a metallic work surface. The magnetic attachment mounts 60 can desirably be selectively engaged so that a user can position the PCMM 10 on to a work surface then engage the magnetic attachment mounts 60 once the PCMM 10 has been placed in a desirable position. In other embodiments, the base 20 can be coupled to a work surface through a vacuum mount, bolts or other coupling devices. Additionally, in some embodiments, the base 20 can comprise various electrical interfaces such as plugs, sockets, or attachment ports 62. In some embodiments, attachment ports 62 can comprise connectability between the PCMM 10 and a USB interface for connection to a processor such as a general purpose computer, an AC power interface for connection with a power supply, or a video interface for connection to a monitor. In some embodiments, the PCMM 10 can be configured to have a wireless connection with an external processor or general purpose computer such as by a WiFi connection, Bluetooth connection, RF connection, infrared connection, or other wireless communications protocol. In some embodiments, the various electrical interfaces or attachment ports 62 can be specifically configured to meet the requirements of a specific PCMM 10.

Still with reference to FIG. 1, in some embodiments, the base 20 of the PCMM 10 can also include a self contained power source 64 such as a battery. Embodiments of the PCMM 10 having a self contained power source can be easily moved to various locations that do not have easy access to a power source such as an AC power outlet, allowing enhanced flexibility in the operating environment of the PCMM 10. In one embodiment, the self-contained power source 64 can be a lithium-ion rechargeable battery that can provide power to the PCMM for periods of use away from a power outlet. In other embodiments, the self-contained power source 64 can be other types of rechargeable batteries such as nickel probemium, nickel metal hydride, or lead acid batteries. In other embodiments, the self-contained power source 64 can be a single use battery such as an alkaline battery.

With continued reference to FIG. 1, the transfer members 24, 26, and 28 are preferably constructed of hollow generally cylindrical tubular members so as to provide substantial rigidity to the members 24, 26, and 28. The transfer members 24, 26, and 28 can be made of any suitable material which will provide a substantially rigid extension for the PCMM 10. The transfer members 24, 26, and 28 can also be configured to define a double tube assembly so as to provide additional rigidity to the transfer members 24, 26, and 28. Furthermore, it is contemplated that the transfer members 24, 26, and 28 in various other embodiments can be made of alternate shapes such as those comprising a triangular or octagonal cross-section.

With continued reference to FIG. 1, some embodiments of the PCMM 10 may also comprise a counterbalance system 80 that can assist a user by mitigating the effects of the weight of the transfer members 26 and 28 and the articulating members 44, 46, 48, and 50. In some orientations, when the transfer members 26 and 28 are extended away from the base 20, the weight of the transfer members 26 and 28 can create difficulties for a user. Thus, a counterbalance system 80 can be particularly advantageous to reduce the amount of effort that a user needs to position the PCMM 10 for convenient measuring. In some embodiments, the counterbalance system 80 can comprise resistance units (not shown) which are configured to ease the motion of the transfer members 26 and 28 without the need for heavy weights to cantilever the transfer members 26 and 28. It will be appreciated by one skilled in the art that in other embodiments simple cantilevered counterweights can be used in place or in combination with resistance units.

As illustrated in FIG. 1, the position of the probe 30 in space at a given instant can be calculated if the length of each transfer member 24, 26, and 28 and the specific position of each of the articulation members 40, 42, 44, 46, 48, 50 are known. The position of each of the articulation members 40, 42, 44, 46, 48, 50 can be measured as a singular rotational degree of motion using a dedicated rotational transducer, which will be described in more detail below. Each transducer can output a signal (for example, an electrical signal), which can vary according to the movement of the 40, 42, 44, 46, 48, 50 in its degree of motion. The signal can be carried through wires or otherwise transmitted to the base 20 of the PCMM 10. The signal can then can be processed from the base 20 and/or transferred to a computer for determining the position of the probe 30 or the contact sensitive member 32 in space.

In some embodiments of the PCMM 10, a rotational transducer for each of the articulation members 40, 42, 44, 46, 48, 50 can comprise an optical encoder. In general, an optical encoder measures the rotational position of an axle by coupling its movement to a pair of internal hubs having successive transparent and opaque bands. In such embodiments, light can be shined through or reflected from the hubs onto optical sensors which feed a pair of electrical outputs. As the axle sweeps through an arc, the output of an analog optical encoder can be substantially two sinusoidal signals which are 90 degrees out of phase. Coarse positioning can be determined through monitoring a change in polarity of the two signals. Fine positioning can be determined by measuring an actual value of the two signals at a specific time. In certain embodiments, enhanced accuracy can be obtained by measuring the output precisely before it is corrupted by electronic noise. Thus, digitizing the position information before it is sent to the processor 102 or computer can lead to enhanced measurement accuracy.

In some embodiments, wired communication between components of the PCMM 10, such as between the probe 30 and the PCMM 10, or between rotational transducers and the base 20 of the PCMM can be provided along a wire bundle comprising four wires: a power wire, a ground wire, a data+ wire, and a data− wire. In other embodiments, wired communication between components of the PCMM 10 can be provided over a wire bundle comprising fewer than four wires. For example, in some embodiments, a two wire data communications protocol, such as the so-called 1-wire® device communications system of Maxim Integrated Products can be used. In the 1-wire® system, a power wire and a ground wire can electronically couple components of the PCMM 10. Data can be transmitted along the power wire through the transmission of pulses having a predetermined duration. These timed pulses can be identified as binary data by components connected via a 1-wire® system. In some embodiments, it can be desired that all electronic components (processor, rotational transducers, and probe) are configured to communicate via the 1-wire® system. In other embodiments, other communications arrangements can be possible. For example, in some embodiments, it can be desirable that the processor and probe electronically communicate via the 1-wire® system, while rotational transducers and the processor electronically communicate wirelessly.

Advantageously, wired communication over fewer wires can reduce the size, cost, and complexity of a PCMM. For example, in PCMMs that include slip rings to allow for infinite relative rotation of adjacent transfer members, fewer slip ring channels are required to accommodate a system with wired communication along two wires. Furthermore, other components of the PCMM such as internal shafts and rotational transducers can be sized based on the number of wires that pass through them. Hence by reducing the number of wires in a wired connection, the overall cost and complexity of the PCMM can be reduced.

Additional details and our embodiments various components of the PCMM 10 can be found in U.S. Pat. No. 5,829,148, U.S. Pat. No. 7,174,651, U.S. patent application Ser. No. 11/963,531, filed Dec. 21, 2007, entitled "IMPROVED JOINT AXIS FOR COORDINATE MEASUREMENT MACHINE", U.S. patent application Ser. No. 11/943,463, filed Nov. 20, 2007, entitled "COORDINATE MEASUREMENT DEVICE WITH IMPROVED JOINT" and U.S. patent application Ser. No. 11/775,081, filed Jul. 9, 2007, entitled "JOINT FOR COORDINATE MEASUREMENT DEVICE", the entire contents of these patents and patent applications being incorporated herein by reference.

FIGS. 2-7 illustrate several embodiments of probes comprising modules or devices configured to provide information relating to calibrating and using probes. As used herein, the term "modules" or "devices" refer to logic embodied by hardware or software (including firmware), or to a combination of both hardware and software, or to a collection of software instructions. Software instructions may be embedded in firmware, such as an EPROM, and executed by a processor. It will be further appreciated that hardware modules may include connected logic units, such as gates and flip-flops, and/or may include programmable units, such as programmable gate arrays or processors. The modules described herein can be implemented as software modules, or may be represented in hardware or firmware. Generally, the modules described herein refer to logical modules that may be combined with other modules or divided into sub-modules despite their physical organization or storage.

Figure 2:
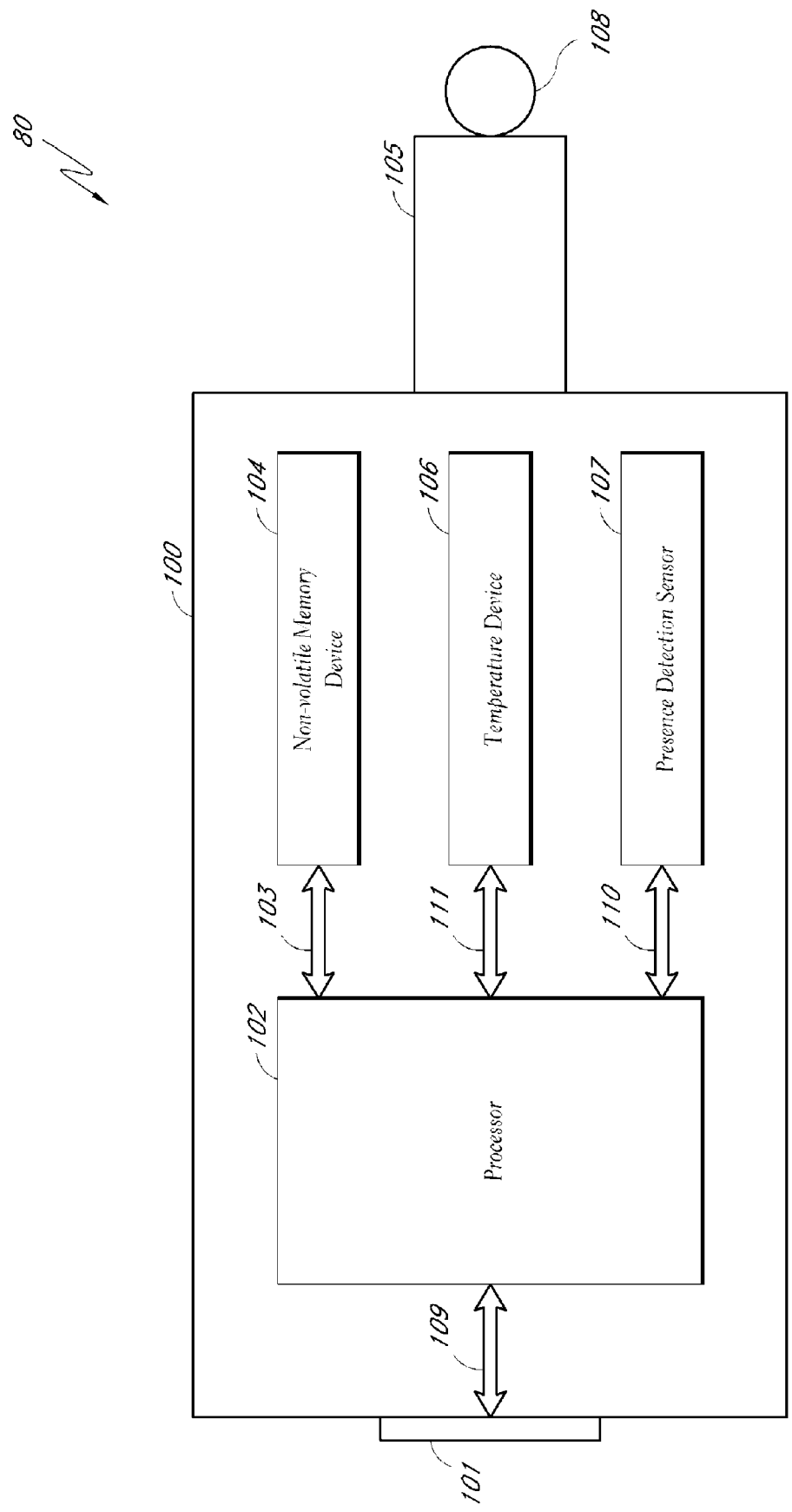
FIG. 2 illustrates a schematic illustration of one embodiment of an improved probe for the system of FIG. 1.

FIG. 2 schematically illustrates one embodiment of an improved probe 80 in greater detail. The probe 80 comprises a probe carriage 100, a probe mount 101, a probe neck 105, and a probe tip 108. The probe carriage 100 is configured to house various modules that, for example, obtain real-time data and/or provide information relating to calibrating the probe with the PCMM 10, etc. The probe mount 101 is configured to attach the probe 80 to the PCMM 10. The probe neck 105 is configured to connect the probe tip 108 with the probe carriage 100. In some embodiments as will be discussed below, the probe neck 105 can be configured to include modules that, for example, obtain the temperature of the probe 80. The probe tip 108 can be configured to engage surfaces of a selected object and/or generate coordinate data on the basis of probe contact as is known in the art.

Still with reference to FIG. 2, the probe carriage 100 further comprises several modules configured, for example, to provide data uniquely identifying the probe 80, facilitate calibration of the probe 80 with the PCMM 10, etc. The probe carriage 100 comprises a processor 102, a solid-state memory device 104, a temperature sensor 106, and a presence detection sensor 107. The solid-state memory device 104, the temperature sensor 106, and the presence detection sensor 107 are connected to the processor 102 using bus lines 103, 111, 110 respectively.

In some embodiments, the processor 102, memory 104, temperature sensor 106, and presence detection sensor 107 may all be integrated in one chip. In other embodiments, they may be separate components mounted on a circuit board or electronically coupled, such as with a wired connection. In other embodiments, only one, two, or three of the components may be present and others not required.

The bus line 109 connects the processor 102 to the probe mount 101 such that any information obtained by the processor 102 from the solid-state memory device 104, the temperature sensor 106, and the presence detection sensor 107 is transmitted from the probe 80 to the PCMM 10 to which the probe 80 is attached. In one embodiment, the PCMM 10 can use the transmitted information to calibrate the probe 80 with the PCMM 10. In another embodiment, the PCMM 10 retransmits the obtained information to a general purpose computer (not shown) configured to calibrate the probe 80 with the PCMM 10. In another embodiment, the PCMM 10 uses the information the PCMM obtains from the processor 102 to retrieve calibration or nominal data related to the probe 80 that is stored in a different media such as a memory key, hard disk, or a computer, as will be further described below.

As illustrated in FIG. 2, the processor 102 in one embodiment is a general purpose central processing unit (CPU) configured to control operations of various modules of the probe 80, including the solid-state memory device 104, the temperature sensor 106, and presence detection sensor 107. Other examples of processors could include, but are not limited to, separate or individual processing cores, separate or distributed processing logic, general purpose processors, special purpose processors, application specific integrated circuits (ASICs) with processing functionality, memory controllers, system controllers, etc. As shown in FIG. 2, the processor 102 is connected to the solid-state memory device 104 through bus line 103, the temperature sensor 106 through the bus line 111, and the presence detection sensor 107 through bus line 110. In one embodiment, the processor 102 is configured to control the operation of the solid-state memory device 104, the temperature sensor 106, and the presence detection sensor 107 using connections 103, 111 and 110. In another embodiment, the processor 102 controls the solid-state memory device 104, for example, by sending instruction to read a particular address in the solid-state memory device 104 and receiving a data signal from the solid-state memory device 104 corresponding to the address sent by the processor 102. In some embodiments, the processor 102 transmits the data it receives from the solid-state memory device 104 to the PCMM 10 using the bus line 109. In another embodiment, the processor 102 obtains a temperature reading from the temperature sensor 106 using the bus line 103 and transmits the temperature reading to the PCMM 10 using the bus line 109. In other embodiments, data transfer to and from the processor 102 can be made wirelessly using a wireless data transmission protocol.

The solid-state memory device 104 is capable of accepting data, storing the data, and subsequently providing the data. The solid-state memory device 104 as illustrated in FIG. 2 depicts a non-volatile electrically erasable programmable read-only memory (EEPROM) device. The processor 102 or another memory controller can selectively write or erase any part of the EEPROM without the need to write or erase the entire EEPROM. Although EEPROM is preferably used in connection with the probe 80 in the various embodiments contained herein, the probe 80 can be configured to comprise any suitable non-volatile electronic data storage device, including, but not limited to, tape, hard disk, optical disk, Flash memory, programmable read-only memory (PROM), erasable PROM (EPROM), etc. In one embodiment, the solid-state memory device 104 is an EEPROM device comprising a 48-bit laser etched serial number. As previously mentioned, the processor 102 can be configured to control the operation of the solid-state memory device 104 by sending control signals through the control lines 103, such as, for example, instructions for the solid-state memory device 104 to write data transmitted through a data bus (not shown) to a memory cell address sent through the address bus (not shown). In certain embodiments, the processor 102 controls the operation of the solid-state memory device 104 using separate system and memory controllers (not shown).

Still with reference to FIG. 2, the solid-state memory device 104 in one embodiment can be configured to include a unique serial or product number, machine readable data that uniquely identifies the particular probe 80 on which the solid-state memory device 104 is located. The unique serial number allows individual serialization of all of the improved probes to advantageously allow subsequent identification of each one of the probes 80. In certain embodiments, the unique serial number can even identify individual probes 80 that belong to the same type or category.

A solid-state memory device 104 comprising a machine readable unique serial number identifying the probe 80 has several advantages. As previously mentioned, if the probe 80 is mounted to the PCMM 10 for the first time, or if a new probe 80 is used for the first time, the probe 80 must be calibrated with the PCMM 10. Each probe 80 has nominal data relating to characteristics of the probe 80, such as, for example, length, category, type, offsets, width, thickness, etc. that is usually contained in different media such as disks, memory keys, etc. This nominal data is used as a starting point to calibrate the probe 80 with the PCMM 10. In some embodiments, the nominal data is stored in a computer that is connected to the PCMM 10. In other embodiments, the nominal data is stored in a storage area located on the PCMM 10. In yet other embodiments, the nominal data for the probe 80 is stored in a different storage media along with the machine readable unique serial number for that particular probe 80. During the calibration process, the PCMM 10 can obtain the nominal data for the probe 80 by first reading the machine readable unique serial number from the probe 80 and obtaining the nominal data located on different media which contains the same unique serial number. As such, the machine readable unique serial number identifying the probe 80 can be used to better match the probe 80 with the corresponding nominal data stored on a different media than conventional systems, some of which do not distinguish probes 80 of the same type or category.

Further in other embodiments, the machine readable serial number uniquely identifying the probe 80 can be used to match calibration data with the probe 80. When the PCMM 10 calibrates the probe 80, the result is data that provides translation from the end of the PCMM 10 to the tip of the probe 80. The calibration data is therefore unique to the particular PCMM 10 and probe 80. As with nominal data, the calibration data is also typically stored in media different from the calibration acquisition device 80, such as, for example, a memory key, hard disk on a computer, or storage area located on the PCMM 10, etc. In some embodiments, the PCMM 10 stores the calibration data for a probe 80 on the different media along with the machine readable serial number of the particular probe 80. When the probe 80 is remounted to the PCMM 10, the PCMM 10, as with the nominal data described above, can obtain the calibration data that is specific to the probe 80 from the different media by first reading the machine readable unique serial number from the probe 80 and obtaining the calibration data that contains the same serial number.

Although the machine readable serial number is stored in the solid-state memory device 104 in the previously disclosed embodiments, the machine readable serial number in other embodiments can be located elsewhere on the probe 80. In some embodiments, the serial number is located on another module located in the probe carriage 100, such as, for example, the processor 102. In other embodiments, the machine readable serial number can be provided by an integrated package of software and/or hardware similar to systems used in warehouse operations, such as, for example, bar codes and RFID tags.

In still other embodiments with respect to FIG. 2, the solid-state memory device 104 can be configured to store nominal data. In one embodiment, the processor 102 stores the nominal data relating to physical characteristics of the probe 80 into the solid-state memory device 104, for example, using the control line 103. The nominal data can be written in the solid-state device 104 during the manufacture stage of the probe 80. In other embodiments, nominal data is written into the solid-state memory device 104 after the probe 80 is assembled, for example, using a general purpose computer configured to write nominal data into the solid-state memory device 104. In some embodiments, an RFID tag on the probe 80 can store the machine readable serial number and/or nominal data. The PCMM 10 can wirelessly retrieve the serial number and/or nominal data from the RFID tag. In other embodiments, communication between the CMM and probe can occur through other wireless protocols, such as WiFi, Bluetooth, or RF. In still other embodiments, the PCMM 10 first reads the machine readable unique serial number from the solid-state device 104, then obtains the nominal data based on the machine readable unique serial number, for example from a different media such as a memory key or another computer, and stores the nominal data into the solid-state device 104 such that the probe 80 will retain nominal data for use in subsequent calibrations. A solid-state memory device 104 configured to store nominal data eliminates the need to maintain a separate media to store nominal data, thereby reducing the difficulty of managing large number of probes and their associated nominal data.

Still with reference to FIG. 2, the probe 80 uses the temperature sensor 106 to measure the temperature of the probe 80 and provide the temperature information to the PCMM 10. As illustrated in FIG. 1, the position of the probe 80 in space at a given instant can be calculated if the length of each transfer member 24, 26, and 28 and the length of the probe 80 are known. The length and other physical parameters of the probe 80 can be obtained by the PCMM 10 during calibration, for example, by reading nominal data from the solid-state memory device 104. However, the length of the probe 80 may change, for example, by expanding in response to an increase in temperature. In some embodiments, the transfer members 24, 26, and 28 of the PCMM 10 and the probe 80 are composed of different material with different heating coefficients and, therefore, expand and/or contract in response to temperature at a different rates. In other embodiments, the transfer members 24, 26, and 28 and the probe 80 are composed of the same material but expand and/or contract at a different rate because the temperature of the probe 80 can be different from temperature of the PCMM 10, for example, due to the heat generated within the PCMM 10.

The PCMM 10 can use the temperature sensor 106 to compensate for the expansion or contraction of the probe 80 due to changes in temperature. In one embodiment, the solid-state memory device 104 contains nominal data related to the temperature characteristics of the probe 80, such as, for example, heating coefficient information, length at a certain default temperature, etc. At any given time, the PCMM 10 can obtain the temperature of the probe 80 from the temperature sensor 106, obtain the coefficient of thermal expansion of the probe 80 from the solid-state memory device 104, and calculate any changes in the physical characteristics of the probe 80 using the obtained temperature and the coefficient of thermal expansion of the probe 80. In some embodiments, the temperature of the probe 80 and the coefficient of thermal expansion of the probe 80 are transmitted, for example by the processor 102, to a general purpose computer attached to the PCMM 10 in order to calculate the changes in physical characteristics of the probe 80. In other embodiments, the PCMM 10 or the general purpose computer obtain the coefficient of thermal expansion of the probe 80 from a different media, such as, for example, a memory key, a disk, a database, etc. In other embodiments, the PCMM 10 and/or general purpose computer use the unique machine readable serial number of the probe 80 to obtain the appropriate coefficient of thermal expansion of the probe 80 from the different media. Compensating for the expansions or contractions of the probe 80 due to changes in temperature using the temperature sensor 106 in the above-described manner eliminates the need for the PCMM 10 to recalibrate the probe 80 in response to temperature effects.

With reference to FIG. 2, the probe 80 comprises the presence detection sensor 107 configured to detect when the probe 80 is attached to the PCMM 10. In one embodiment, the presence detection sensor 107 sends a signal to the PCMM 10 indicating that a probe is attached to the PCMM 10 once the presence detection sensor 107 detects that the probe 80 is attached to the PCMM 10. In another embodiment, the processor 102 obtains the signal from the presence detection sensor 107 and transmits the signal to the PCMM 10 using the bus line 109. In other embodiments, the PCMM 10 receives a signal indicating the presence of the probe 80 and queries the probe 80 to determine whether the probe 80 contains nominal or calibration data. In other embodiments, after receiving detection signal from the probe 80, the PCMM 10 queries the probe 80 for machine readable unique serial number and uses the machine readable unique serial number to obtain nominal or calibration data located in a separate storage media (e.g. memory key, disk, different computer, the PCMM 10) or from the probe 80.

Although the probe 80 of FIG. 2 comprises the processor 102, solid-state memory device 104, temperature sensor 106 and presence detection sensor 107 as separate modules located on the probe carriage 100, other configurations are possible. For example, some or all of the modules the processor 102, solid-state memory device 104, temperature sensor 106 and presence detection sensor 107 may be located on a different area of the probe 80. Further still, the probe 80 may comprise modules that combine the functions of one or more of the processor 102, solid-state memory device 104, temperature sensor 106 and presence detection sensor 107. Other configurations not explicitly mentioned herein are also possible.

Figure 3:
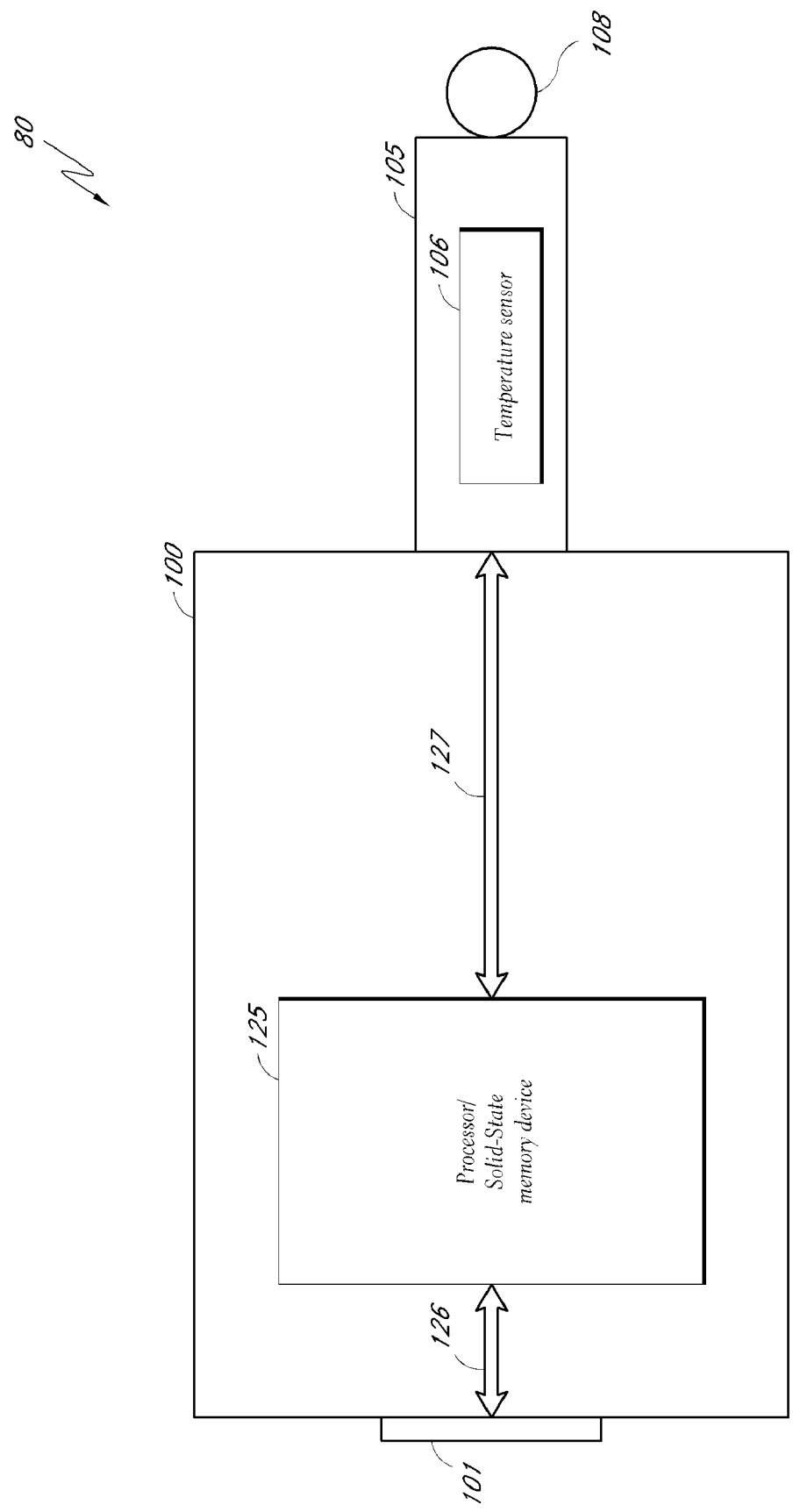
FIG. 3 is a schematic illustration of another embodiment of an improved probe for the system of FIG. 1.

FIG. 3 illustrates another embodiment of the improved probe 80. As previously mentioned, the probe 80 comprises a probe carriage 100, a probe mount 101, a probe neck 105, and a probe tip 108. Both the probe carriage 100 and the probe neck 105 are configured to house various modules that, for example, obtain real-time data and/or provide information relating to calibrating the probe 80 with the PCMM 10. The probe carriage 100 comprises the device 125 configured to perform the functions of the processor 102 and the solid-state memory device 104 of FIG. 2. The probe neck 105 comprises the temperature sensor 106 of FIG. 2.

Still with reference to FIG. 3, the device 125 is connected to the mount 101 through the bus line 126 and to the probe neck 105 through the bus line 127. In one embodiment, the device 125 controls the temperature sensor 106, for example, by sending control signals using the bus line 127. In another embodiment, the device 125 obtains temperature information from the temperature sensor 106 through bus line 127 and transmits the temperature information to the PCMM 10 using the bus line 126. As previously mentioned, the PCMM 10 may be configured to use the temperature information it obtains from the device 125 to compensate for changes in probe 80 size that arise due to changes in temperature.

Still with reference to FIG. 3, the device 125 can be configured to accept data, store the data, and provide the data. In one embodiment, the device 125 provides machine readable serial number uniquely identifying the probe 80. In some embodiments, nominal or calibration data for the probe 80 is stored in a different media such as a memory key or a disk along with the machine readable serial number of the probe 80. As previously discussed, the PCMM 10 can read the machine readable serial number from the device 125 and obtain nominal or calibration data for the particular probe 80 located on a different media by matching the serial number of the probe 80 with the serial number stored with the nominal or calibration data. In still another embodiment, the device 125 is configured to store nominal data. In another embodiment, the device 125 is configured to store calibration data. In embodiments where the device 125 stores nominal or calibration data, the PCMM 10 can obtain the nominal or calibration data directly from the probe 80, for example by using the device 125 to transmit the signal from the device 125 to the PCMM 10.

Figure 4:
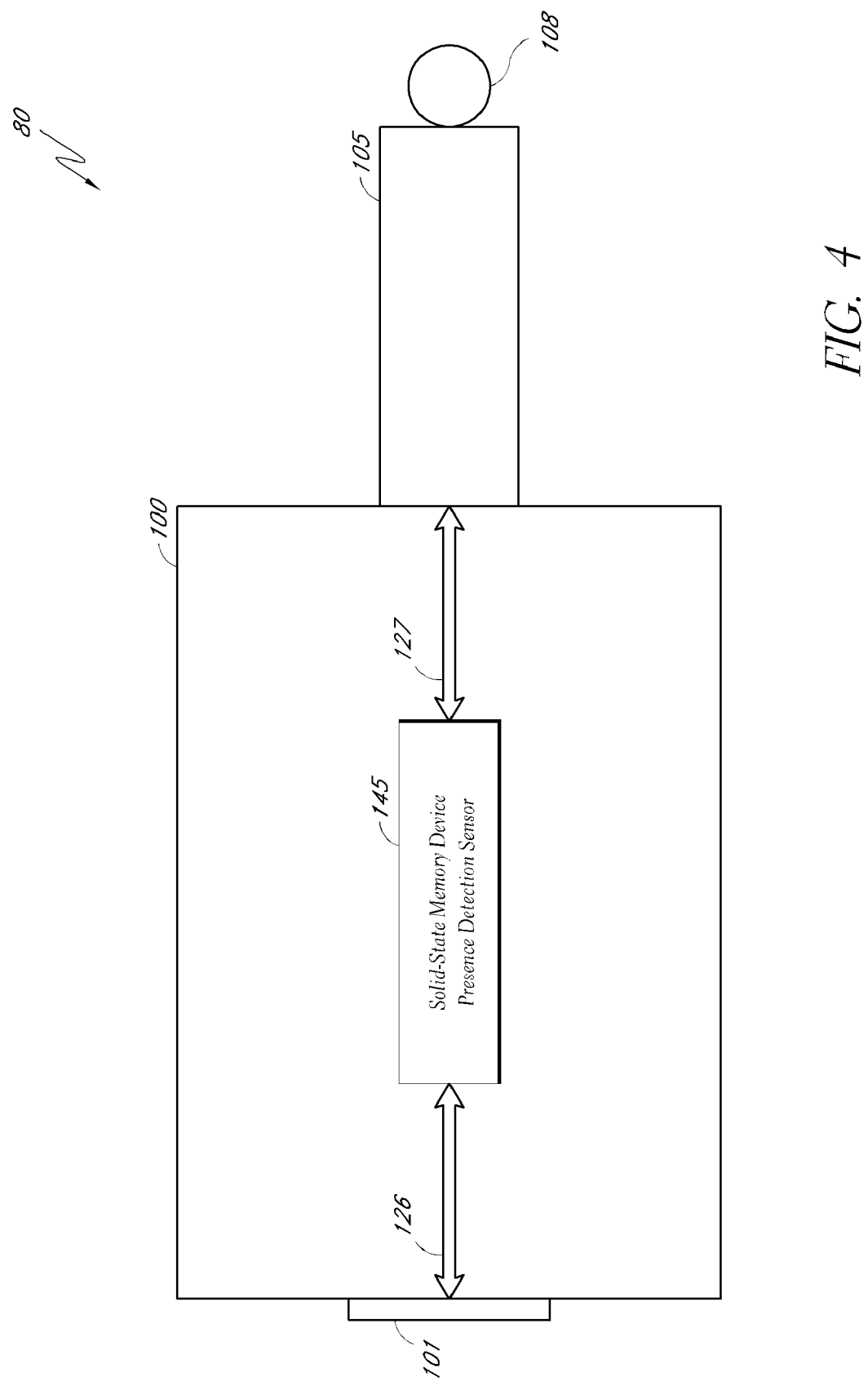
FIG. 4 illustrates a schematic illustration of an embodiment of an improved probe or the system of FIG. 1.

FIG. 4 illustrates another embodiment of the improved probe 80. As previously mentioned, the probe 80 comprises a probe carriage 100, a probe mount 101, a probe neck 105, and a probe tip 108. The probe carriage 100 comprises the device 145 configured to perform the functions of the solid-state memory device 104 and presence detection sensor 107 of FIG. 2.

Still with reference to FIG. 4, the device 145 is connected to the mount 101 through the bus line 126. The device 145 can be configured to accept data, store the data, and provide the data. In one embodiment, the device 145 provides machine readable serial number uniquely identifying the probe 80. In some embodiments, nominal or calibration data for the probe 80 is stored in a different media such as a memory key or a disk along with the machine readable serial number of the probe 80. The PCMM 10 can first read the machine readable serial number from a probe 80 and obtain nominal or calibration data for the particular probe 80 located on a different media by matching the serial number of the probe 80 with the serial number stored with the nominal or calibration data. In another embodiment, the device 145 is configured to store nominal data. In another embodiment, the device 145 is configured to store calibration data. In embodiments where the device 145 stores nominal or calibration data, the PCMM 10 can obtain the nominal or calibration data directly from the probe 80.

The device 145 of FIG. 4 is also configured to detect when the probe 80 is mounted to the PCMM 10. In one embodiment, the PCMM 10 detects the presence of the probe 80 using signals transmitted from the device 145 through the bus line 126. As discussed above, in some embodiments the probe 80 can include both nominal data and calibration data. In some embodiments, the probe 80 can include nominal data and multiple sets of calibration data, each set corresponding to calibration data for use on a specific CMM or PCMM. In some embodiments, the PCMM 10 detects the presence of the probe 80 and query the probe to determine whether the probe 80 contains nominal and/or calibration data. In some embodiments, the PCMM queries the probe to determine whether the probe 80 contains calibration data for that particular PCMM. In other embodiments, after detecting the probe 80, the PCMM 10 queries the probe 80 for a machine readable unique serial number and use the machine readable serial number to obtain nominal or calibration data located in a separate storage media (e.g. memory key, disk, different computer, the PCMM 10).

Figure 5:
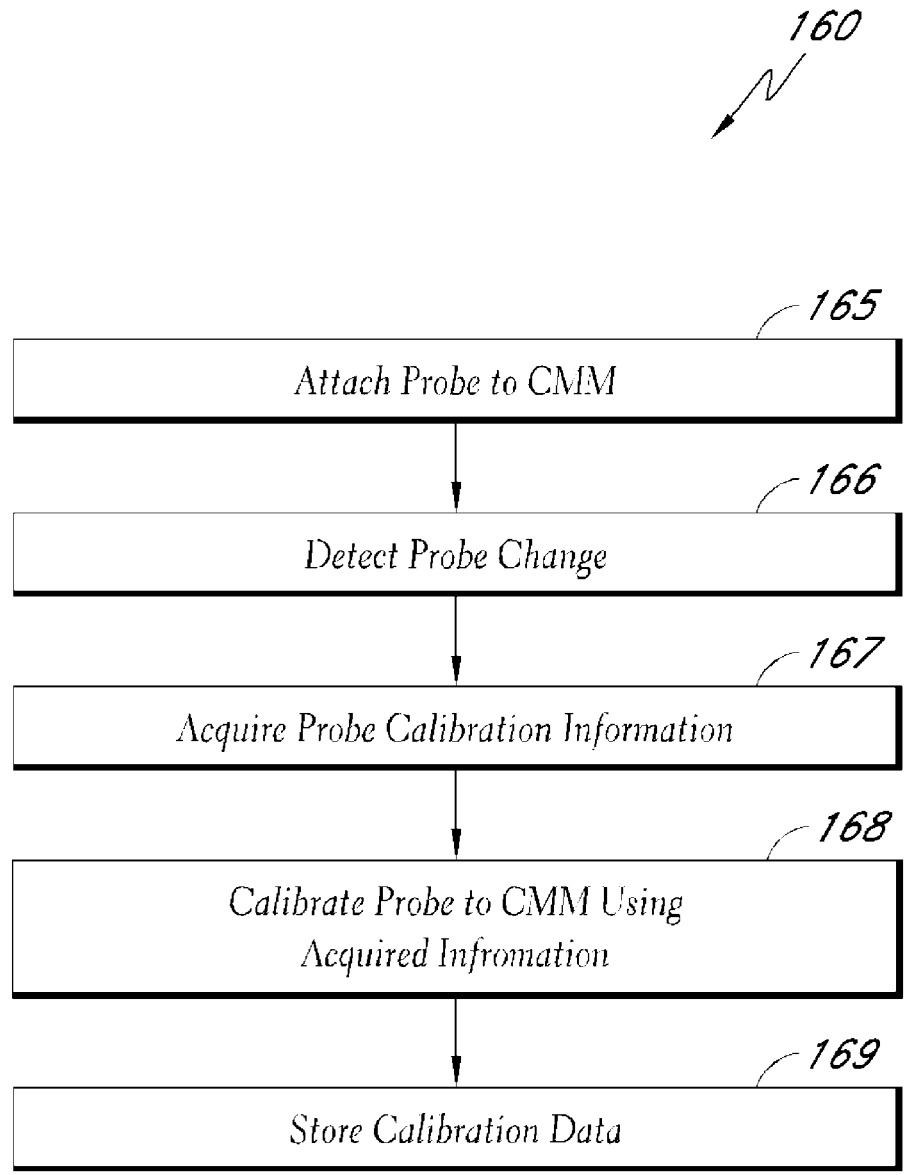
FIG. 5 is a flowchart diagram of one method of using an improved probe.
Figure 6:
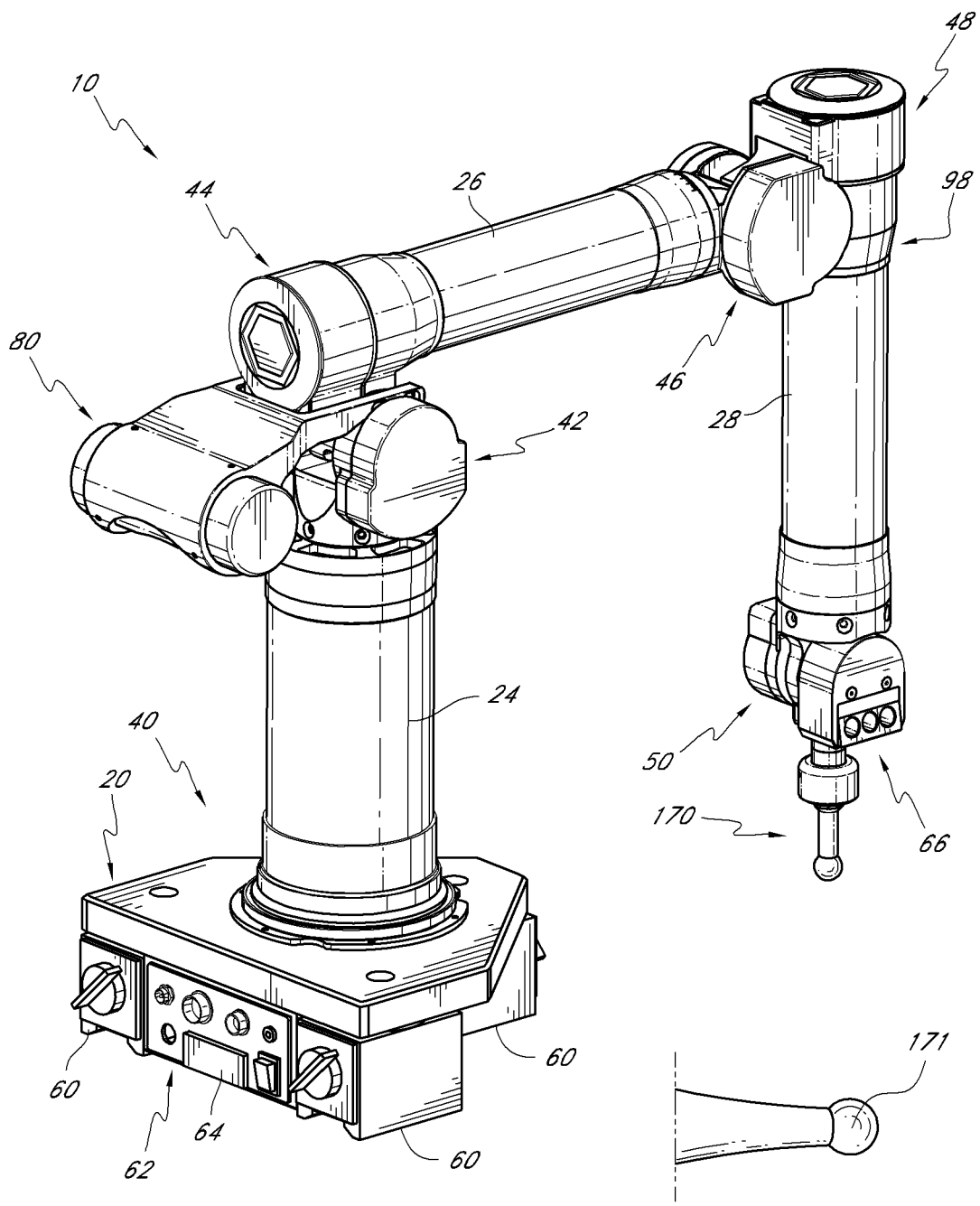
FIG. 6 depicts a schematic perspective view of one configuration of a touch trigger probe coordinate measurement machine.
Figure 7:
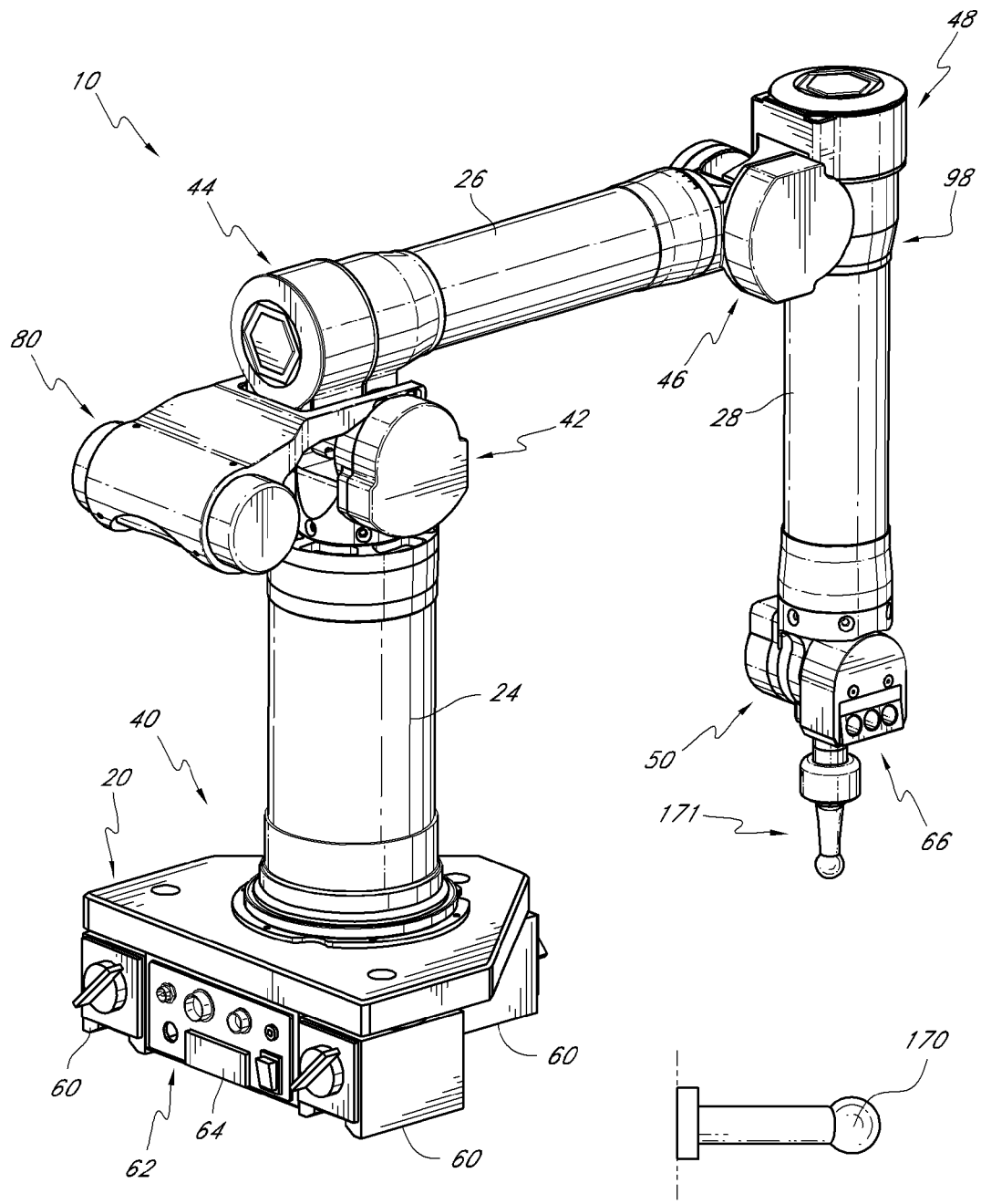
FIG. 7 depicts a schematic perspective view of one configuration of a a hard probe coordinate measurement machine.

FIG. 5 illustrates a flowchart of a method of using an improved probe according to one embodiment. In step 165, a probe is attached to a PCMM, for example, such as a touch trigger probe 170 mounted on the PCMM 10 shown in FIG. 6 or the hard probe 171 mounted on the PCMM 10 in FIG. 7. In this particular example, the touch trigger probe 170 is removed from the PCMM 10 and the hard probe 171 is attached to the PCMM 10 for illustrative purposes. As shown in FIGS. 6 and 7 and in various embodiments of the PCMM, several types of probes can be used for coordinate acquisition. Thus, a user can quickly and easily remove one probe and replace it with another probe. This rapid connection capability of the probe can be particularly advantageous in a PCMM that can be used for a wide variety of measuring techniques (e.g. measurements requiring physical contact of the probe with a surface followed by measurements requiring only optical contact of the probe) in a relatively short period of time.

In step 166, the attached probe is detected by the PCMM. In one embodiment, when a user changes probes, for example by removing the touch trigger probe 170 as shown in FIG. 6 and attaching the hard probe 171 to the PCMM 10 as shown in FIG. 7, a signal that the hard probe 171 is attached to the PCMM 10 is transmitted to the PCMM 10, for example, from the presence detection sensor 107 of FIG. 2. In another embodiment, the processor 102 obtains the signal from the presence detection sensor 107 through the bus line 110 and transmits the signal to the PCMM 10 using the bus line 109. In still another embodiment, the device 145 of FIG. 4 detects the attachment of the probe 171 to the PCMM 10 and transmits the signal to the PCMM 10 using the bus line 126. In other embodiments, the PCMM 10 can detect the attachment of the probe by monitoring electrical resistance at electronic coupling with the probe, similar to previous techniques of identifying a probe with an identification resistor.

In step 167, information related to calibrating the probe is acquired by the PCMM. In some embodiments, nominal data for the probes is stored in a different media such as a memory key or a disk along with the machine readable unique serial number of the probe. With reference to FIG. 7, the PCMM 10 can read the machine readable unique serial number from a probe 80, such as the hard probe 171, and obtain nominal or calibration data for the particular hard probe 171 located on a different media by matching the serial number of the hard probe 171 with the serial number stored with the nominal data. In another embodiment, the hard probe 171 is configured to store nominal data, for example, using the solid-state storage device 104 of FIG. 2. The processor 102 of FIG. 2 transmits the nominal data from the solid-state storage device 104 to the PCMM 10 using the bus line 109.

In step 168, the PCMM calibrates the probe using the nominal data acquired in step 169. The result of calibration is calibration data that provides translation from the end of the particular PCMM to the tip of the probe. In step 169, the PCMM stores the calibration data. With respect to FIG. 7, the PCMM 10 can be configured to store the calibration data in the hard probe 171, for example, using the solid-state device 104 of FIG. 2 or the device 125 of FIG. 3. When the hard probe 171 is later attached to the PCMM 10, the PCMM 10 can obtain the calibration data from the hard probe 171, for example, using the solid-state memory device 104 of FIG. 2. In some embodiments, a probe 171 can be configured to store more than one set of calibration data, with each set of calibration data corresponding to a particular PCMM 10 or CMM on which the probe 171 has been calibrated. Thus, advantageously, the probe 171 can be easily interchanged between multiple coordinate measurement machines.

In other embodiments, the PCMM 10 stores the calibration data in a different media (e.g. memory key, disk, storage area on a computer, storage area on the PCMM, etc.). In still other embodiments, the PCMM 10 stores the calibration data in other media along with the machine readable unique serial number of the hard probe 171. The PCMM 10 may later retrieve the calibration data stored in a different media by first reading the unique serial number from the hard probe 171 and locating the calibration data containing the same unique serial number.

The various devices, methods, procedures, and techniques described above provide a number of ways to carry out the invention. Of course, it is to be understood that not necessarily all objectives or advantages described may be achieved in accordance with any particular embodiment described herein. Also, although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed is:

1. A probe for a coordinate measurement machine comprising:

a probe tip;

at least one device comprising non-modifiable information relating to calibrating the probe with the coordinate measurement machine and configured to provide said information relating to calibrating the probe with the coordinate measurement machine; and a probe mount configured to mount the probe tip and the at least one device to the coordinate measurement machine, wherein the probe tip, probe mount, and at least one device form a singular unit configured to mount to a coordinate measurement machine.

2. The probe of claim 1, wherein the at least one device comprises a solid-state memory device configured to store data.

3. The probe of claim 2, wherein the solid-state memory device comprises a non-volatile electrically erasable programmable read-only memory (EEPROM) device.

4. The probe of claim 2, wherein the solid-state memory device is further configured to provide a machine readable serial number configured to uniquely identify the probe.

5. The probe of claim 2, wherein the solid-state memory device is further configured to store nominal data relating to the characteristics of the probe.

6. The probe of claim 2, wherein the solid-state memory device is further comprises a presence detection sensor.

7. The probe of claim 1, wherein the at least one device comprises a temperature sensor configured to provide the temperature of the probe.

8. The probe of claim 1, wherein the at least one device comprises a presence detection sensor configured to indicate that the probe is mounted onto a coordinate measurement machine.

9. The probe of claim 1, wherein the at least one device comprises a processor configured to control the operations of the solid-state memory device, the temperature sensor, or the presence detection sensor.

10. The probe of claim 1, wherein the probe tip comprises at least one device configured to provide temperature of the probe or information relating to calibrating the probe with the coordinate measurement machine.

11. The probe of claim 1, wherein the probe is configured to communicate wirelessly with the coordinate measurement machine.

12. The probe of claim 11, where said wireless communication is over a communications protocol selected from the group of Bluetooth, WiFi, and radio frequency.

13. The probe of claim 1, wherein the at least one device configured to provide information is configured to provide information over a two wire data communications protocol.

14. The probe of claim 13, wherein the two wire data communications protocol also provides power.

15. The probe of claim 13, wherein the two wire data communications protocol comprises only a power wire and a ground wire.

16. The probe of claim 1, wherein the non-modifiable information comprises a laser etched serial number.

17. A spatial coordinate measurement system comprising:

a coordinate measurement machine;

a singular probe that is removably attached to the coordinate measurement machine to form an end of the coordinate measurement machine; and wherein the singular probe comprises at least one device comprising non-modifiable information relating to calibrating the probe with the coordinate measurement machine and configured to provide said information relating to calibrating the probe with the coordinate measurement machine.

18. The spatial coordinate measurement system of claim 17, wherein the coordinate measurement machine calibrates the probe based at least in part on the information provided by the at least one device configured to provide information relating to calibrating the acquisition device with the coordinate measurement machine.

19. The spatial coordinate measurement system of claim 18, wherein the probe comprises a temperature sensor configured to provide the temperature of the probe.

20. The spatial coordinate measurement system of claim 18, wherein the probe comprises a presence detection sensor configured to indicate that the probe is mounted onto a coordinate measurement machine.

21. The spatial coordinate measurement system of claim 17, wherein the coordinate measurement machine comprises a solid-state memory device configured to provide data.

22. The spatial coordinate measurement system of claim 21, wherein the solid-state memory device is configured to provide a machine readable serial number uniquely identifying the probe.

23. The spatial coordinate measurement system of claim 21, wherein the solid-state memory device comprises a non-volatile electrically erasable programmable read-only memory (EEPROM) device.

24. The spatial coordinate measurement system of claim 21, wherein the solid-state memory device is further configured to provide nominal data relating to the physical parameters of the probe.

25. The spatial coordinate measurement system of claim 17, wherein the coordinate measurement machine comprises an articulated arm.

26. The spatial coordinate measurement system of claim 17, wherein the device configured to provide information is configured to provide information over a two wire data communications protocol.

27. The spatial coordinate measurement system of claim 26, wherein the two wire data communications protocol also provides power.

28. The spatial coordinate system of claim 27, wherein the two wire data communications protocol comprises only a power wire and a ground wire.

29. The spatial coordinate measurement system of claim 17, wherein the non-modifiable information comprises a laser etched serial number.

30. A method for calibrating a coordinate measurement machine comprising:
attaching a singular probe to the coordinate measurement machine to form an end of the coordinate measurement machine;
detecting the singular probe attached to the end of the coordinate measurement machine;
acquiring non-modifiable calibration information related to the singular probe from the singular probe at the end of the coordinate measurement machine; and
calibrating the singular probe to the coordinate measurement machine using at least part of the acquired non-modifiable calibration information.

31. The method of claim 30, wherein detecting the probe further comprises providing a presence detection sensor to indicate that probe is mounted onto the coordinate measurement machine.

32. The method of claim 30, wherein acquiring calibration information related to the probe further comprises providing a solid-state memory device configured to provide calibration information.

33. The method of claim 30, wherein acquiring calibration information related to the probe further comprises acquiring a machine readable serial number uniquely identifying the probe.

34. The method of claim 30, wherein acquiring calibration information related the probe further comprises acquiring nominal data relating to the physical characteristics of the coordinate the probe.

35. The method of claim 34, wherein acquiring calibration information related the probe further comprises acquiring nominal data relating to the physical characteristics of the coordinate the probe using a machine readable serial number uniquely identifying the probe.

36. The method of claim 30, wherein acquiring calibration information related the probe further comprises acquiring temperature of the probe.

37. The method of claim 30, wherein calibrating the probe to the coordinate measurement machine further comprises providing translation from the end of the probe to the tip of the probe.

38. The method of claim 30, further comprising the step of transmitting information from the probe to the coordinate measurement machine over a two wire data communications protocol.

39. The method of claim 38, wherein the two wire data communications protocol also provides power.

40. The method of claim 39, wherein the two wire communications protocol comprises only a power wire and a ground wire.

41. The method of claim 30, wherein the non-modifiable calibration information comprises a laser etched serial number.

* * * * *

UNITED STATES PATENT AND TRADEMARK OFFICE
CERTIFICATE OF CORRECTION

| | | |
|---|---|---|
| PATENT NO. | : 8,122,610 B2 | |
| APPLICATION NO. | : 12/057918 | |
| DATED | : February 28, 2012 | |
| INVENTOR(S) | : Hogar Tait and Brian Frohlich | |

It is certified that error appears in the above-identified patent and that said Letters Patent is hereby corrected as shown below:

At Column 3, Line 16, Change "a a" to --a--.

At Column 14, Line 27, In Claim 6, after "device" delete "is".

At Column 16, Line 23, In Claim 34, change "related the" to --related to the--.

At Column 16, Line 27, In Claim 35, change "related the" to --related to the.--.

At Column 16, Line 32, In Claim 36, change "related the" to --related to the--.

Signed and Sealed this
Tenth Day of July, 2012

David J. Kappos
*Director of the United States Patent and Trademark Office*